US009959759B2

(12) United States Patent
Schulz

(10) Patent No.: US 9,959,759 B2
(45) Date of Patent: May 1, 2018

(54) METHOD, COMPUTER PROGRAM PRODUCT, AND ELECTRONIC CONTROL DEVICE FOR LOCATING A PARKING SPACE FOR VEHICLES

(71) Applicant: Bayerische Motoren Werke Aktiengesellschaft, Munich (DE)

(72) Inventor: Ralf Schulz, Puchheim (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 406 days.

(21) Appl. No.: 14/681,667

(22) Filed: Apr. 8, 2015

(65) Prior Publication Data
US 2015/0213715 A1 Jul. 30, 2015

Related U.S. Application Data

(63) Continuation of application No. PCT/EP2013/070823, filed on Oct. 7, 2013.

(30) Foreign Application Priority Data

Oct. 9, 2012 (DE) .................. 10 2012 218 334

(51) Int. Cl.
*B60Q 1/48* (2006.01)
*G08G 1/14* (2006.01)
*G06F 17/30* (2006.01)
(52) U.S. Cl.
CPC ....... *G08G 1/141* (2013.01); *G06F 17/30241* (2013.01); *G08G 1/144* (2013.01); *G08G 1/147* (2013.01); *G08G 1/148* (2013.01)
(58) Field of Classification Search
CPC ........ G08G 1/141; G08G 1/147; G08G 1/148; G08G 1/144; G06F 17/30241
See application file for complete search history.

(56) References Cited

U.S. PATENT DOCUMENTS 6,411,895 B1 6/2002 Lau et al.
2007/0129974 A1 6/2007 Chen et al.
(Continued)

FOREIGN PATENT DOCUMENTS

CN 102037320 A 4/2011
CN 102456274 A 5/2012
(Continued)

OTHER PUBLICATIONS

Chinese Office Action issued in counterpart Chinese Application No. 201380060236.8 dated Mar. 17, 2016, with English translation (eleven (11) pages).
(Continued)

*Primary Examiner* — Ryan Sherwin
(74) *Attorney, Agent, or Firm* — Crowell & Moring LLP

(57) ABSTRACT

To find a parking space for a vehicle in a target area, a connection server stores connection data associated with the target area for a plurality of data servers. A search request to find a parking space in the target area is addressed to the connection server. The connection server uses the association data to establish a connection to the data servers and, in the process, queries whether availability data relating to available parking spaces in the target area are stored in the respective database. In a first query stage, the data servers are preselected, in which case first parking space data based on the target area are requested by the connection server and corresponding first feedback data from the data servers are used to respond whether the respective data server contains parking space data relating to the target area. Based on the first feedback data, the connection server decides which of the respective data servers are preselected, and at least one data server is selected as a selection server, and second feedback data, more detailed than the respective first feed-
(Continued)

back data, are respectively retrieved in a second query stage of the selection server.

10 Claims, 2 Drawing Sheets

(56) References Cited

U.S. PATENT DOCUMENTS

| | | | |
|---|---|---|---|
| 2009/0171563 A1* | 7/2009 | Morimoto | G01C 21/3453 |
| | | | 701/533 |
| 2010/0057355 A1 | 3/2010 | Fein et al. | |
| 2010/0302068 A1 | 12/2010 | Bandukwala | |
| 2011/0015934 A1 | 1/2011 | Rowe et al. | |
| 2012/0092190 A1 | 4/2012 | Stefik et al. | |
| 2012/0299749 A1* | 11/2012 | Xiao | G08G 1/04 |
| | | | 340/932.2 |
| 2015/0213715 A1 | 7/2015 | Schulz | |

FOREIGN PATENT DOCUMENTS

| | | |
|---|---|---|
| DE | 199 33 666 A1 | 1/2001 |
| DE | 10 2006 014 024 A1 | 6/2007 |
| DE | 601 30 695 T2 | 7/2008 |
| DE | 10 2008 060 331 A1 | 3/2010 |
| EP | 1 070 635 A2 | 1/2001 |
| EP | 1 128 350 A1 | 8/2001 |
| EP | 2 907 123 B1 | 12/2016 |
| JP | 2003-263662 A | 9/2003 |
| JP | 2007-164554 A | 6/2007 |
| TR | 2011 03609 A2 | 6/2012 |
| TW | 200723149 | 6/2007 |
| WO | WO 03/039040 A1 | 5/2003 |
| WO | WO 2010/081563 A1 | 7/2010 |
| WO | WO 2012/092276 A2 | 7/2012 |
| WO | WO 2012/141665 A1 | 10/2012 |

OTHER PUBLICATIONS

International Search Report (PCT/ISA/210) dated Nov. 29, 2013, with English translation (six (6) pages).
German Search Report dated Oct. 2, 2013, with partial English translation (ten (10) pages).
German-language Japanese Office Action issued in Japanese counterpart application No. 2015-536082 dated Aug. 15, 2016 (Five (5) pages).

* cited by examiner

METHOD, COMPUTER PROGRAM PRODUCT, AND ELECTRONIC CONTROL DEVICE FOR LOCATING A PARKING SPACE FOR VEHICLES

CROSS REFERENCE TO RELATED APPLICATIONS

This application is a continuation of PCT International Application No. PCT/EP2013/070823, filed Oct. 7, 2013, which claims priority under 35 U.S.C. § 119 from German Patent Application No. 10 2012 218 334.5, filed Oct. 9, 2012, the entire disclosures of which are herein expressly incorporated by reference.

BACKGROUND AND SUMMARY OF THE INVENTION

The invention relates to a method, a computer program product and an electronic control device for finding a parking space for vehicles. There are often considerable shortages of parking spaces in cities, in particular at peak times in rush-hour traffic or on weekends, for example, with the result that the available parking spaces can only be found by the vehicle drivers with difficulty. This often results in the vehicles having to travel on the city streets for a relatively long time in order to search for parking spaces. This results in additional traffic which, in turn, overall adversely affects the traffic situation and may result in traffic jams.

US 2010/0302068 A1 discloses a search system in which persons who remove a vehicle from a parking space use mobile radio devices to report this information to an information platform which is accessible to other mobile radio users. A user who retrieves this information can then deliberately head for the parking space which has been reported as being free. Communication can be carried out by means of so-called "apps" using smartphone mobile radio devices. In this case, their GPS (Global Positioning System) information can be additionally used to limit search results to those parking spaces reported as available which can be reached by the user looking for a parking space in a sufficiently short time. This makes it possible to reduce the risk of the parking space being randomly occupied in the meantime by another vehicle. Nevertheless, this disadvantageous situation of an ultimately futile search for a parking space and the associated high volatility of the parking space information provided cannot be precluded.

WO 03/039040 A1 describes a search system for searching for a parking space, in which a parking space in a predetermined area, for example in a parking garage, can be booked in advance using a reservation server. The server is used to query a database in order to determine whether a parking space is available for a desired period, and data relevant to the reservation, for example the identification of the vehicle, are possibly stored in the database and the reservation is confirmed. The disadvantage in this case is that such a reservation service and the reserved parking space require further complicated technical measures, including the maintenance thereof, for example for entry control, in order to be able to ensure the reservation. They are generally also disadvantageous because they are associated with considerable parking fees for the person searching for the parking space even though a more favorable parking space, for example on the road, would possibly be available.

WO 2012/092276 A2 discloses a method in which the probability of a parking space being available on a street is respectively modeled.

The contents of the publications cited above are hereby incorporated by reference herein.

The object of the invention is to make it possible to flexibly and reliably find a parking space for vehicles in a target area.

This and other objects are achieved according to the invention by a method, computer program product, or electronic control device for finding a parking space for a vehicle in a target area, wherein:

a connection server stores connection data associated with the target area for a plurality of data servers each storing data relating to at least one parking space, a search request to find a parking space in the target area is addressed to the connection server, and the connection server uses the association data to establish a connection to the data servers and, in the process, queries whether availability data relating to available parking spaces in the target area are stored in the respective database. If availability data are available, the respective data servers transmit feedback data to the connection server.

The query by the connection server is carried out in multiple stages in such a manner that, in a first query stage, the data servers are preselected, in which case first parking space data based on the target area are requested by the connection server and corresponding first feedback data from the data servers are used to respond whether the respective data server contains parking space data relating to the target area. On the basis of the first feedback data, the connection server then decides which of the respective data servers are preselected. At least one data server is then selected from the preselected data servers as a selection server.

Second feedback data which are more detailed than the respective first feedback data at least in terms of the parking space location are respectively retrieved in a second query stage with respect to the selection server.

The features according to the invention can be implemented in a method, in a computer program product and/or in an electronic control device.

The invention recognized that it is advantageous, for an efficient parking space search and allocation, to technically combine different search systems and their data servers in such a manner that it is possible to respectively select the most suitable data server according to predefined search criteria, and to select the search provider operating this data server, for a search request. For this purpose, provision may also be advantageously made for the anonymous feedback data to be assessed in the connection server and for the feedback from different search systems or databases used in the latter to be compared on the basis of the assessment. In this case, the anonymous and/or detailed feedback data can be assessed on the basis of a correction factor which is specific to the data server and is dynamically changed in the connection server, in which case at least one characteristic variable determined when finding the parking space is respectively used for changing. The characteristic variable can be determined automatically, for example using an item of information obtained by GPS or using data from vehicle operation, for example the running time of the engine before being switched off or the distance traveled to the parking space since the complete parking space information was received. If the vehicle has actually traveled to the determined location of the parking space but has not been parked there for a certain time, this would be an indication that the parking space information was incorrect, for example. The correction factor associated with the relevant data server is then downgraded according to a lower reliability. The correction factor can also be changed according to statistical methods from a multiplicity of search requests.

The invention is also advantageously used to carry out a two-stage query which makes it possible, on the one hand, to limit the volumes of data because not all available data from all search providers have to be automatically transmitted, but rather only selected data. The feedback data in the first query stage may be the availability data and/or data derived therefrom. An expected parking space search time, data relating to the distance from the destination or data relating to the costs associated with the search service and/or parking fees may be provided, for example, as first feedback data. Limiting the volumes of data in the first query stage makes it possible, in particular, to save costs and the workload for mobile radio networks which are used to establish a connection between the connection server and a data terminal, for example a navigation system or PDA (Personal Digital Assistant), which is provided in the vehicle and addresses the search request to find the parking space in the target area to the connection server.

The first feedback data do not include, in particular, any data relating to the exact parking space location. This makes it possible to ensure that the user makes a specifically documented selection of the search provider and the second query stage is carried out, in which specific reservation data relating to a parking garage are generated, for example, and are then transmitted as second feedback data before heading for the parking space. The feedback data in the second query stage may determine the exact parking space location using GPS coordinates, may represent an image of the parking space or the parking space environment and/or may contain a text description of the parking space and/or other information.

In another advantageous exemplary embodiment, the connection server addresses queries relating to the availability of feedback data in predefined target areas to the data servers independently of a search request at predefined intervals of time. This is particularly advantageous when an open interface is provided in the connection server such that search providers can independently couple their respective data servers for providing their search service to the connection server, for example by simply storing a network address of the data server in the connection server, for example an Internet network address. The connection server and the data servers may then interact using the interface and/or computer program modules respectively stored and loaded in them in such a manner that the connection server automatically queries all stored data servers at the predefined intervals of time, for example daily, weekly or monthly, in order to determine whether and possibly for which target areas the data servers contain corresponding data. The data from such a general availability query can be interchanged at least partially in the same manner as in the first query stage of a specific parking space search described above. The connection server can be selected using criteria set in the vehicle.

The type, format and volume of the data interchanged between the connection server and the data servers are preferably stipulated in advance, in which case a minimum volume of data and/or a maximum volume of data can be stipulated. The volume of data between the connection server and the terminal in the vehicle may likewise be stipulated, with the result that the operator of the terminal can respectively receive a uniform volume of data via a uniform operator interface independently of the selected search provider. In this case, it is also advantageous that the user is not confronted with different systems belonging to different search providers but rather requires only one contact partner with the system thereof, which contact partner acts as a uniform interface and can guarantee the user a particular quality of the search service.

In another advantageous exemplary embodiment, at least position data (coordinates) relating to the parking space are transmitted to a navigation system provided in the vehicle from the second feedback data. The navigation system can then directly determine the route to the parking space and can display the route on a display.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
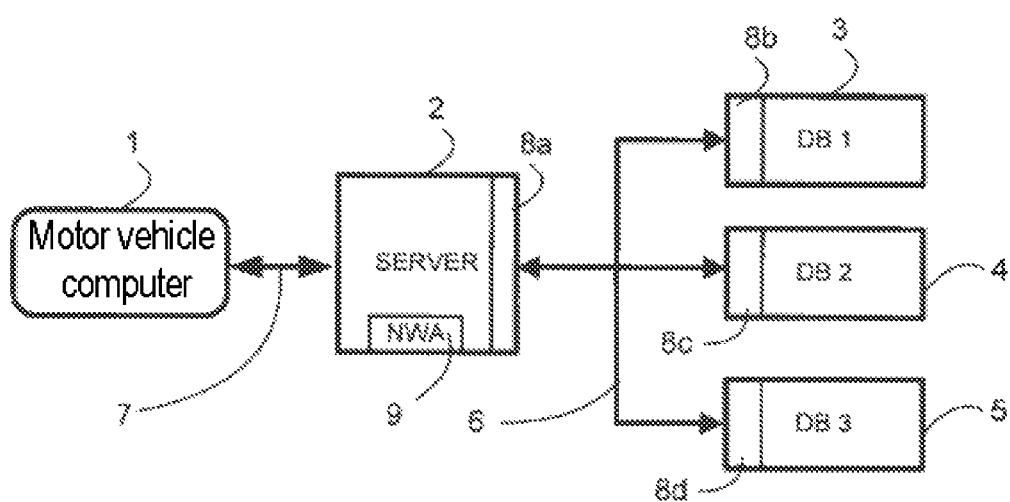
FIG. 1 is a schematic block diagram of a structure of control computers.

A vehicle computer 1 having a vehicle navigation system which can be used to create parking space search requests and to display search results is provided in the structure illustrated in FIG. 1. The vehicle computer 1 or the navigation system 1 can be permanently installed in the vehicle, for example an automobile or truck, or else may be carried in the form of a mobile device, for example in the form of a PDA, in the vehicle. A connection server 2, which is provided in a computing center and is connected to a plurality of decentralized data servers (of which three data servers 3, 4, 5 are illustrated by way of example) via network connections 6, is also shown. The network connections 6 may each be completely or partially wireless or wired, optionally secure or non-secure, and may be established via the Internet, for example. For this purpose, the Internet addresses of the data servers 3, 4, 5 are stored in an address memory 9 of the connection server 2. The connection between the vehicle computer 1 and the connection server 2 is established via a wireless mobile radio connection and/or Internet connection 7. With regard to the transfer of data between the vehicle computer 1 and the data servers 3, 4, 5, the connection server 2 acts as a proxy, that is to say the vehicle computer 1 communicates only with the connection server 2 directly, but not with the data servers 3, 4, 5.

The method described below makes it possible to operate different services with the same field of application, parking space search services in this example, but a different (heterogeneous) implementation using a uniform interface. The user of the services communicates directly with the connection server 2 by means of his vehicle computer 1 and is not confronted with the task of having to communicate with the heterogeneous multiplicity of data servers 3, 4, 5. Quality assurance and handling of the search requests are carried out centrally in the connection server 2.

Different search providers operating the data servers 3, 4, 5 may provide entirely different parking space search services, for example as parking garage operators who make it possible to book a parking space for a fee online and in the process concomitantly incorporate a billing system in the search, or as public free portals which display free parking spaces in real time, or as private individuals who rent out their own parking space for a short time. It is also possible to provide search providers having automatic, statistical crowd-sourcing approaches which use a self-modifying model relating to the parking behavior in order to calculate navigation routes along which the probability of a free space is as high as possible.

Search providers may use, in particular, the methods for searching for and/or allocating available parking spaces, as described in the publications mentioned at the outset. Reference is therefore again made to their contents at this juncture.

The data servers 3, 4, 5 belonging to the search providers are selectively connected to the vehicle computer 1 via the connection computer 2 (proxy) and its network interface 8a following a search request via their network interfaces 8b, 8c, 8d. In this case, the vehicle computer 1 does not communicate with the data servers 3, 4, 5 belonging to the different providers but rather only with the connection computer 2. This control connection computer 2 can then forward the customer's requests to those computers 3, 4, 5 belonging to parking space search services which are connected to it. A new data server belonging to a parking space service can be easily registered thereby by supporting the interfaces defined in the connection server 2, in which case the network address of the new data server is stored in the connection server 2 as well as various details relating to the scope of the search service, for example the spatial area covered by the search service, the type of search service, the guaranteed parking space, statistical selection of public parking spaces etc.

Figure 2:
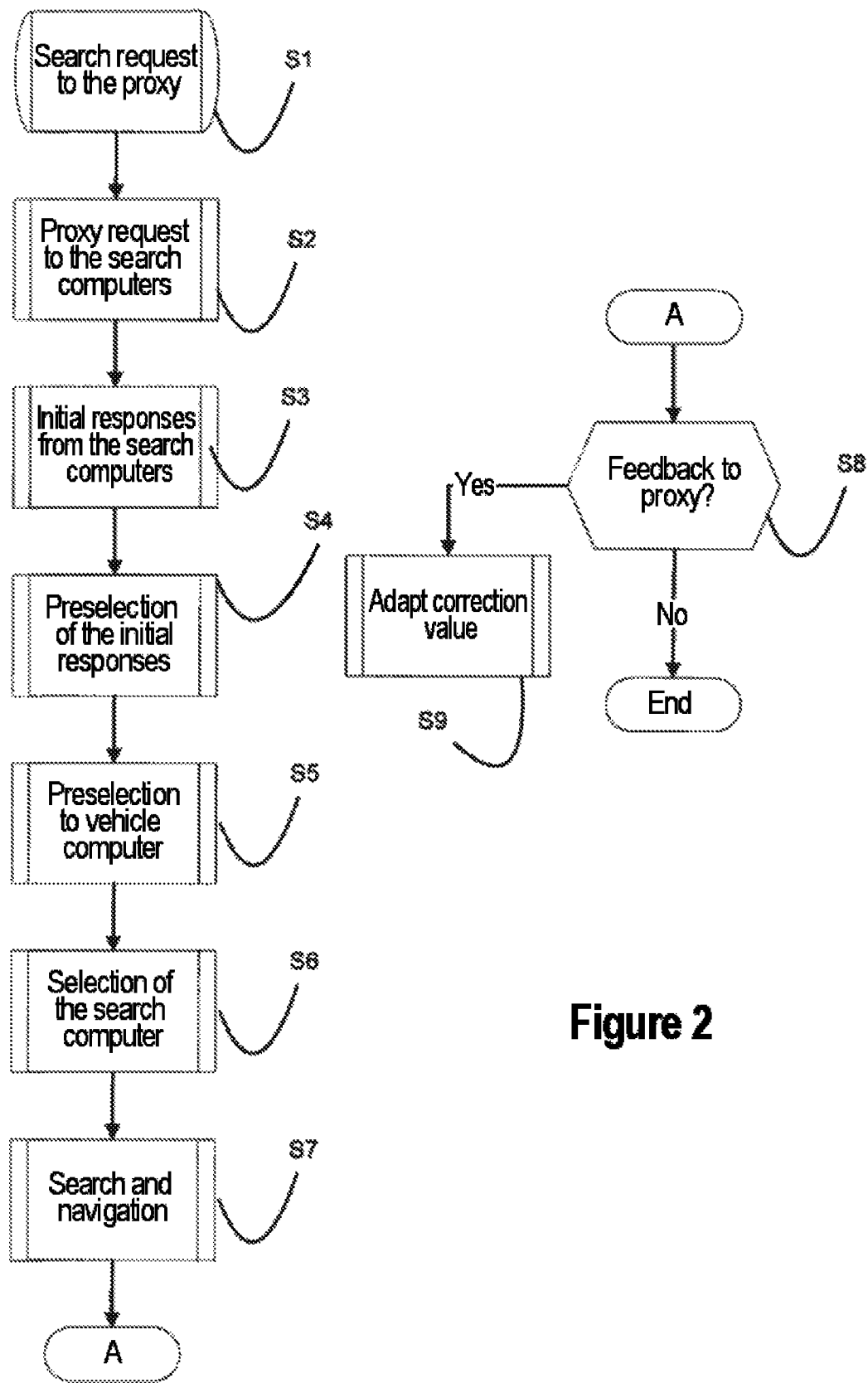
FIG. 2 is a flowchart for a search process.

The manner in which the parking space search is handled and is reported to the vehicle computer 1 can be described as follows using FIG. 2.

On the vehicle computer 1, an operator uses a graphical control panel, for example, to specify that he wishes to search for a parking space, for example with a statement of the location and time. This can also take place automatically following a single button press if, for example, the location and time emerge from the current routing (destination and approximate arrival time) of a navigation system of the vehicle computer 1, or manually by inputting the corresponding data. In this case, it is possible to input further search criteria, for example reservation in a parking garage or search for a public free parking space, whether a parking space is intended to be searched for in the shortest possible time or at the shortest possible distance from the destination, whether the parking space is intended to be searched for as cost-effectively as possible or with the highest possible availability or up to a maximum fee, which vehicle type or vehicle size (for example compact car, medium-sized car, SUV, truck) is intended to be parked, etc. This makes it possible to optimize the search and for the user to specifically assess the search result.

In step S1, the search request is transmitted to the connection server 2 (proxy), for example using a radio network. The connection server 2 contacts all available data servers 3, 4, 5 belonging to different search service providers. In order to keep the volume of data to be transmitted and processed small, in particular, communication between the connection server 2 and the data servers 3, 4, 5 is carried out in stages (cascaded) as follows.

In step S2, the proxy 2 respectively sends a first, rough request to the respective search providers via the connected data servers 3, 4, 5 in order to determine whether the search providers cover the target area (first stage of the cascade). This request can alternatively be configured such that the proxy 2 queries the service providers at regular intervals independently of user requests in order to determine which area is covered by each of the service providers. The coverage information is then stored in the proxy 2 and is directly used during search requests to decide to which of the data servers 3, 4, 5 a search request is respectively addressed.

In step S3, the data servers 3, 4, 5 belonging to the different providers provide initial responses to the request containing limited information. This information does not yet contain the specific parking space location but may include:

1) expected parking space search time,
2) expected distance from the destination,
3) expected costs (for example for parking garage use), and/or
4) further information, for example parking space guarded/not guarded, covered/not covered, parking space reserved/free/free only with a certain probability.

In step S4, this information is used as a basis to preselect the search services in the connection server 2. For this purpose, the response information is first of all multiplied by a correction factor κ which indicates the average deviation of the respective characteristic numbers from the actual determined value of the respective service. This corrected information is used to classify the provider's search quality. In addition, the providers can be selected and classified on the basis of the search options initially selected by the operator such as parking garage, public parking space, etc.

The information from the selected search services is forwarded, possibly in the classified order, from the connection server 2 to the vehicle computer 1 in step S5 and is displayed there. In step S6, a specific search provider is selected there and the detailed search request (second stage of the cascade) is transmitted to the corresponding data server 3, 4, 5 via the connection server 2. In step S6, the data relating to the parking space location determined in the search in the relevant data server 3, 4, 5 are reported back to the vehicle computer 1 and are used there to navigate the vehicle to the parking space.

After the vehicle has headed for the parking space, step S8 decides whether the vehicle computer 1 transmits characteristic data relating to the parking space search, for example relating to the actual availability of the parking space, the distance to the destination, search time, back to the connection computer 2. These characteristic data are, in turn, used to adapt the above-mentioned correction value κ for the provider in step S9. The correction value can be adapted using statistical methods.

Example of Correction Value Adaptation

A provider claims that his parking space will be at a distance of d=100 m from the destination. On the basis of 200 search processes to date, the correction factor κ for this provider is 1.5. In the vehicle computer 1, this service is therefore displayed as a parking space at a distance of 150 m from the destination, corresponding to dκ=100 m*1.5. This value is compared with the corresponding values of all other search services. In this example, 150 m is the smallest value of all providers. The parking space found is actually 250 m away from the destination. For this one case, the deviation is therefore 2.5 with respect to the target distance. The correction factor is therefore corrected to (200*1.5+2.5)/201=1.51 for now 201 search processes.

The example shows that it is likewise advisable to record the spread and to extend the method in such a manner that the value displayed for the user does not correspond to the expected value (that is to say 150 m in this example), but rather the value is calculated using a correction factor corrected by n standard deviations as d(κ+nσ). If the standard deviation of the correction factor is 0.5, for example, and if n=1, the display of 200 m would result.

The correction method can basically be refined in any desired manner. For example, a single correction factor could be used for all values from step S4, or a separate correction factor could be used for each of these values. It would be possible to respectively correct only a selective correction factor which has been selected as decisive for a specific search and has been provided with a high priority factor. If, for example, the vicinity to a particular destination is provided with a high priority, only the correction factor for the distance could be changed but not the correction factor for the time. Alternatively, all values could be changed.

The formula for correcting or changing the correction factor could be more complicated. For example, certain providers could describe certain areas as particularly well covered, other areas as being under construction, and different spreads or correction factors could accordingly be provided for different areas.

The correction factors could be calculated on the basis of a sliding average instead of on the basis of an absolute average, as described. Temporal variations would also be included. Search providers with excessively high standard deviations or excessively high correction factors could then be excluded from the search.

The computer-controlled systems described above may have technical devices which are known per se, for example input devices in the form of a keyboard, a mouse, a touchscreen, a joystick or voice control, as well as a microprocessor, a data and control bus, a display device (screen or projection display) as well as a main memory, a read-only memory, a network and/or mobile radio card for wired and/or wireless network connections. A corresponding computer program product may be stored and loaded in a main memory and/or read-only memory of the respective computer-controlled system and may be executed by the microprocessor. Independently of this, however, it may also be in the form of a file, for example by download from a data server, or on a data storage medium or may be respectively partially stored, loaded and executed on different ones of the involved systems. For this purpose, the computer program product may have a modular structure and individual modules may each be loaded and/or executed on different ones of the involved computer systems.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for finding a parking space for a vehicle in a target area, the method comprising the acts of:
   storing, in a connection server, connection data associated with the target area for a plurality of data servers, each of which store data relating to at least one parking space;
   receiving, by the connection server, a search request from the vehicle to find a parking space in the target area;
   establishing a connection to the plurality of data servers, by the connection server, using the connection data associated with the target area for the plurality of data servers, and querying whether availability data relating to available parking spaces in the target area are stored in a respective database and, if availability data are available, receiving feedback data transmitted by the respective data servers to the connection server; and
   wherein the act of querying by the connection server is carried out in multiple stages such that:
      in a first query stage, the data servers are preselected, in which case first parking space data based on the target area are requested by the connection server and corresponding first feedback data received from the data servers are used to respond whether the respective data server contains parking space data relating to the target area;
      based on the first feedback data, the connection server decides which of the respective data servers are preselected; and
      at least one of the data servers is selected from the preselected data servers as a selection server, and second feedback data, which are more detailed than the respective first feedback data at least in terms of parking space location, are respectively retrieved in a second query stage with respect to the selection server,
   wherein the first and/or second feedback data are assessed based on a correction factor specific to a particular data server and being dynamically changeable in the connection server, and further wherein at least one characteristic variable determined when finding the parking space is respectively used for dynamically changing the correction factor.

2. The method according to claim 1, wherein the first feedback data are assessed in the connection server, and the feedback from different data servers is compared based on the assessment.

3. The method according to claim 1, wherein the correction factor is changed according to at least one statistical method based on multiple search operations for parking spaces conducted via the respective data server.

4. The method according to claim 1, wherein the connection server addresses queries relating to the availability of feedback data in predefined target areas to the data servers at predefined intervals of time and independently of a received search request.

5. The method according to claim 1, wherein an open network interface is provided on the connection server, via which open network interface the data servers are registered and are coupled via a connection network.

6. The method according to claim 1, wherein the connection server is selected based on criteria set in the vehicle.

7. The method according to claim 1, wherein the received search request is addressed to the connection server by an electronic control device in the vehicle.

8. The method according to claim 7, wherein:
   the electronic control device is a navigation system in the vehicle,
   at least some of the second feedback data are position data relating to the parking space, and
   the position data are loaded into the navigation system and are used by the navigation system for vehicle routing.

9. A computer program product comprising a non-transitory computer readable medium having stored thereon program code segments that:
   stores, in a connection server, connection data associated with the target area for a plurality of data servers, each of which store data relating to at least one parking space;
   receives, by the connection server, a search request from the vehicle to find a parking space in the target area;

establishes a connection to the plurality of data servers, by the connection server, using the connection data associated with the target area for the plurality of data servers, and queries whether availability data relating to available parking spaces in the target area are stored in a respective database and, if availability data are available, receives feedback data transmitted by the respective data servers to the connection server; and wherein the querying by the connection server is carried out in multiple stages such that:

in a first query stage, the data servers are preselected, in which case first parking space data based on the target area are requested by the connection server and corresponding first feedback data received from the data servers are used to respond whether the respective data server contains parking space data relating to the target area;

based on the first feedback data, the connection server decides which of the respective data servers are preselected; and at least one of the data servers is selected from the preselected data servers as a selection server, and second feedback data, which are more detailed than the respective first feedback data at least in terms of parking space location, are respectively retrieved in a second query stage with respect to the selection server, wherein the first and/or second feedback data are assessed based on a correction factor specific to a particular data server and being dynamically changeable in the connection server, and further wherein at least one characteristic variable determined when finding the parking space is respectively used for dynamically changing the correction factor.

10. An electronic control device, comprising:

a computer in which is loaded and executed the computer program product according to claim 9.

* * * * *